United States Patent [19]
Adler et al.

[11] Patent Number: 5,342,067
[45] Date of Patent: Aug. 30, 1994

[54] METHOD AND APPARATUS FOR MACHINING SUBSTRATE PLATES FOR MAGNETIC MEMORY DISKS

[75] Inventors: Meryle D. Adler, Corning; Harold G. Shafer, Jr., Rock Stream, both of N.Y.

[73] Assignee: Corning Incorporated, Corning, N.Y.

[21] Appl. No.: 103,709

[22] Filed: Aug. 9, 1993

[51] Int. Cl.⁵ .............................................. B25B 11/00
[52] U.S. Cl. ........................................ 279/3; 51/131.5; 51/235; 269/21; 279/158
[58] Field of Search .............. 279/3, 158; 269/20, 269/21; 51/131.5, 235

[56] References Cited
U.S. PATENT DOCUMENTS

| | | | |
|---|---|---|---|
| 3,082,013 | 3/1963 | Thielenhaus | 279/16 |
| 3,599,377 | 8/1971 | Dartnell | 51/284 |
| 3,729,206 | 4/1973 | Cachon et al. | 279/3 |
| 3,964,355 | 6/1976 | Daniels | 83/169 |
| 4,603,867 | 8/1986 | Babb et al. | 279/3 |
| 4,671,145 | 6/1987 | Fehrenbach et al. | 82/1 |
| 4,787,787 | 11/1988 | Hopwell et al. | 409/219 |

FOREIGN PATENT DOCUMENTS 124077  10/1978  Japan ........................... 269/20

*Primary Examiner*—Steven C. Bishop
*Attorney, Agent, or Firm*—Robert L. Carlson

[57] ABSTRACT

This invention relates to a method and apparatus for retaining disk-like structures, such as magnetic memory substrate plates, or disks, during machining, cutting, or grinding operations. A fluid is applied to one surface of the disk to retain the other surface of the disk against a chuck at a force which is sufficient to maintain the disk against the chuck during the operations.

24 Claims, 2 Drawing Sheets

METHOD AND APPARATUS FOR MACHINING SUBSTRATE PLATES FOR MAGNETIC MEMORY DISKS

FIELD OF THE INVENTION

The present invention relates to a method and apparatus for use in machining the surfaces of disk-like structures such as substrate plates for magnetic memory plates or disks, in which cutting tools are guided over the rotating memory plate in a feed movement corresponding to the desired surface form of the resultant memory disk.

BACKGROUND OF THE INVENTION

Magnetic memory disks are commonly utilized as storage media, such as, for example, as hard drives in computers. Such magnetic memory disks typically consist of ceramic substrate plates which are ground to the precise dimensions required for the particular application involved.

Magnetic memory disks are usually required to be produced with extremely high tolerances for flatness, surface, and edge quality. This is particularly true in computer hard disk applications, where the magnetic memory disk spins very close to the magnetic read/write recording heads. Consequently, to produce memory disks which satisfy these requirements, precision grinding and machining techniques are utilized to shape the disks.

One such grinding and machining technique involves the use of a high-precision turning lathe. During this operation, the disks are typically fastened to the face of a chuck by applying a vacuum from the chuck to the disk.

Examples of such vacuum holding apparatus are disclosed in U.S. Pat. No. 3,729,206 to Cachon et al. and U.S. Pat. No. 4,671,147 to Fehrenbach et al. These patents disclose holding the substrate disks onto the chuck by providing the chuck with concentrically arranged annular grooves or holes which are connected to a vacuum source. By applying a vacuum to the substrate plate via the holes or grooves in the face of the chuck, the substrate plate is held in place during the grinding operation. However, such vacuum chucks have not been able to consistently provide enough force to retain the disk during all types of machining operations. Consequently, efforts have been made to improve them. U.S. Pat. No. 4,603,867 to Babb et al. discloses a vacuum chuck wherein the applied vacuum force is improved by providing an O-ring on the peripheral edge of the chuck between the chuck and the disk.

Unfortunately, vacuums can typically only be applied at pressures of less than about 1 atmosphere. Even when applied very efficiently, this relatively low pressure is not always sufficient to maintain the disk against the chuck during machining operations, such as, for example, edge grinding operations. Further, as the outside diameter of the memory disk is ground down, the surface area available for exposure to the vacuum chuck gets smaller, thereby further increasing the difficulty in applying an adequate vacuum.

The present invention is directed to an apparatus and method for grinding magnetic memory disks which avoids the deficiencies of prior art grinding processes.

SUMMARY OF THE INVENTION

One aspect of the present invention relates to an apparatus for retaining, during processing, disk-like structures (such as flat magnetic memory plates or other semiconductor structures) having opposed major surfaces, comprising:

a chuck having a surface for contacting at least a portion of one of the major surfaces of said semiconductor structure; and a means for applying a flow of fluid to the other major surface of said structure, said flow of fluid sufficient to retain said semiconductor structure against the contacting surface of said chuck during processing.

Another aspect of the present invention relates to a method for retaining such disk-like structures during machining operations comprising:

providing a chuck, driveable about an axis, having a flat face for contacting one side of said structure; and applying a stream of fluid to the other side of said structure and thereby retaining the one side of said structure against the flat face of said chuck.

Another aspect of the present invention relates to a method for machining such disk-like structures, such as substrate plates for magnetic memory disks having an annular storage area thereon, comprising:

providing a chuck, driveable about an axis, having a flat face with a plurality of vacuum connected openings thereon;

retaining one side of said structure against said face by said vacuum;

axially centering said structure on the axis of said chuck;

applying a stream of fluid to the other side of said structure to retain said structure against the flat face of said chuck; and machining a portion of said structure.

The methods and apparatus encompassed by the above described aspects of the present invention have numerous advantages over prior art substrate retaining systems.

One advantage is that the force with which the substrate is retained against the chuck is increased greatly in comparison to conventional substrate retaining devices which utilize vacuum only. Forces of up to 2-5 atmospheres (202.64 to 506.6 kilopascals) of uniformly distributed pressure are easily achievable using the apparatus and methods of the present invention. Further, these results are achieved without the pressure source having to contact the surface of the substrate.

DETAILED DESCRIPTION OF THE DRAWINGS

Figure 1:
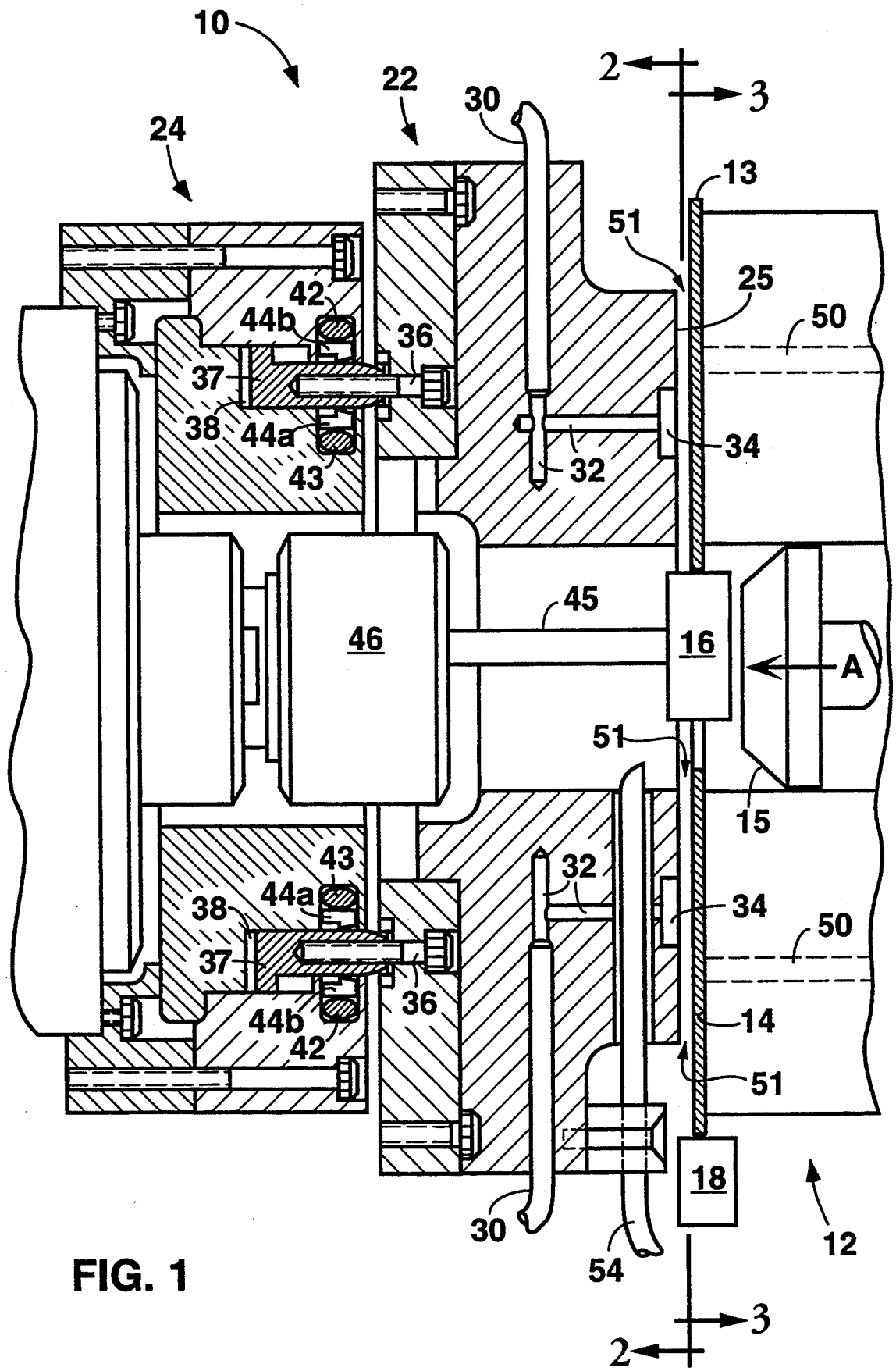
FIG. 1 is a cross-sectional view of a disk support system in accordance with the present invention.

FIG. 1 is a cross-sectional view of a disk support system in accordance with the present invention. The system includes fluid bearing 10 and vacuum chuck 12, for retaining magnetic memory disk substrate 13 on the face 14 of chuck 12. A centering pin 15 is provided to center substrate 13 on face 14 of chuck 12. Internal grinding wheel 16 and external grinding wheel 18 are provided for grinding the inside and outside diameter of substrate 13.

In a preferred embodiment, fluid bearing 10 consists of a fluid transfer member 22 and a support section 24. Fluid transfer member 22 includes front face 25, and a plurality of fluid inlet lines 30, which combine with conduits 32 to transport fluid to one or more orifices 34 on face 25 of fluid transfer member 22. After exiting orifice 34, the transported fluid will impinge on one side of substrate 13, thereby retaining the other side of substrate 13 against face 14 of chuck 12. Fluid transfer section 22 is rotatably connected to support section 24 via an annular anchor ring 37 to which fluid transfer section is attached via a plurality of bolts 36. Each of the bolts 36 is anchored around the periphery of annular anchor ring 37, which is slidably retained within annular cavity 38 of support section 24. Support section 24 is supported using any suitable support device, such as a conventional support frame (not shown). Anchor ring 37 is free to move inwardly and outwardly within the limits of travel provided by the depth of cavity 38. Fluid bearing 10 may therefore be moved towards and away from chuck 12 by appropriate adjustment of the air pressure within the cavity 38. Thus, preferably, cavity 38 is provided with an air line (not shown) through which the pressure in cavity 38 can be controlled. It is preferable that fluid bearing 10 be capable of being moved a distance of at least ½ inch from chuck 12, to facilitate removal and placement of disks on chuck 12. The ease with which anchor ring 37 slides within cavity 38 is somewhat dictated by the pressure exerted by internal O-ring 43 and external O-ring 42, which together provide a compressive force on anchor ring 37 via rings 44a and 44b.

In operation, fluid bearing 10 is initially positioned away from chuck 12 so that a magnetic memory disk substrate may be located on the face 14 of chuck 12. A vacuum is then typically applied through channels 50, which connect to face 14 of chuck 12, to substrate 13, and the magnetic substrate disk 13 is thereby retained on face 14 of chuck 12. The vacuum force generated by such vacuum chuck devices is typically less than about 1 atmosphere. Chuck 12 is preferably designed to be rotatable about an axis to facilitate grinding and machining operations. In FIG. 1, this axis of rotation coincides with the shaft of directional arrow A.

In a preferred embodiment, the force applied by the vacuum is sufficient to retain the disk on the face 14 of chuck 12, during rotation of chuck 12, yet at the same time is weak enough to allow magnetic memory disk 13 to be slidably positioned on face 14. Grinding wheel 16 is capable of being moved back and forth in the directions indicated by arrow A and opposite thereto, via axle 45, which is retractable within motor 46. Alternatively, of course, the entire motor assembly could be moved (rather than providing a retractable axle/motor combination), by a suitable drive means, to achieve the same effect. Motor 46 is also capable of rotating axle 45, and thereby also rotating grinding wheel 16. Initially, grinding wheel 16 is moved in the direction indicated by arrow A so that it is positioned close to motor 46 and completely outside of the internal diameter of disk 13. Consequently, by moving centering pin 15 in the direction indicated by arrow A while chuck 12 is rotating, the beveled surface of centering pin 15 will contact the inside diameter of disk 13 and thereby center disk 13 on face 14 of chuck 12. Centering pin 15 is then moved out of the way by appropriate movement in the direction opposite arrow A.

Once disk 13 is centered and retained on face 14 of vacuum chuck 12, fluid bearing 10 is moved in the direction opposite that indicated by arrow A, so that it is close enough to disk 13 to apply a retaining amount of fluid to disk 13. Preferably, during operation, fluid bearing 10 is maintained a relatively short distance from chuck 12. A preferred operating distance is between 0.005–0.010 inches (0.127 to 0.254 mm), more preferably about 0.008 inches (0.2 mm). In operation, the fluid is propelled into inlet passageway 30, through internal conduits 32, and out through a plurality of orifices 34 in face 25 of fluid bearing 10. After exiting orifices 34, the fluid contacts against one side of the disk 13, and thereby retains the other side of the disk 13 to chuck 12. Such forces are much greater than forces typically achieved using conventional vacuum techniques (about 1 atmosphere, or 101 kilopascals). Any residual fluid is free to escape from the system via gap 51 between substrate disk 13 and fluid bearing 10.

Once disk 13 is centered and retained against face 14 of chuck 12 by the force exerted from fluid bearing 10, internal grinding wheel 16 is moved into operable position, in the direction opposite that indicated by arrow A, so that it is in position to grind the internal diameter of disk 13. Grinding wheel 16 is then moved in a direction perpendicular to the axis around which chuck 12 rotates, so that, as material is removed from the inside diameter of disk 13, grinding wheel 16 can be moved further outwardly, from the axis of rotation, to remove more material from disk 13, until the desired inside diameter of disk 13 is achieved. Similarly, a grinding wheel 18 is provided, which is supported by a suitable mounting or support structure and drive means (neither of which are shown), and located adjacent to vacuum chuck 12, so that grinding wheel 18 can be moved in a direction perpendicular to the axis of rotation of chuck 12. During operation, grinding wheel 18 is moved inwardly toward the axis of rotation to remove the desired amount of material from the outside of disk 13 to obtain the desired outside diameter of disk 13.

The particular fluid used by fluid bearing 10 is not critical, and thus the fluid may be virtually any fluid capable of retaining disk 13 against chuck 12, so long as the fluid is compatible with the material that the disk is made of. A preferred fluid is an incompressible fluid, such as, for example, water.

Figure 2:
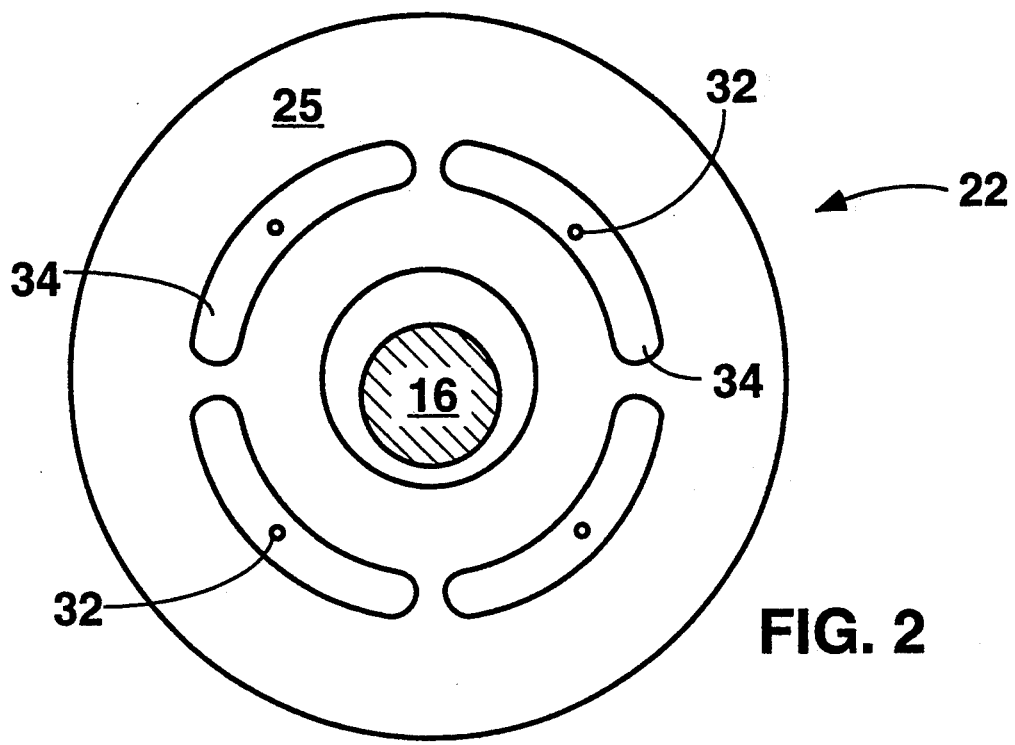
FIG. 2 is a front view of the fluid bearing in accordance with the present invention, taken along line 2—2 of FIG. 1.

FIG. 2 is a front view of the face 25 of water bearing 10, and illustrates a preferred embodiment of the invention. In the embodiment illustrated in FIG. 2, four separate orifices 34 are provided on face 25, through which the fluid is propelled at disk 13. Preferably, each of these orifices is arcuately shaped to more closely correspond to the circular disk shape of the disk 13.

In a preferred embodiment, the fluid is forced through fluid inlet lines 30, having a ¼ inch diameter, at a pressure of about 40 to 80 psi. The fluid is then propelled through connecting conduits 32 having a 1/16 inch diameter, and finally into arcuately shaped orifices 34 having a depth of 1/16 inch (measured from front face 25 of fluid bearing 10), and a width of about ¼ inch. Of course, a wide variety of other channel dimensions, conduit dimensions, and orifice shapes and dimensions could also be utilized in the method and apparatus of the present invention. By locating a fluid bearing having the above described dimensions so that face 25 is a distance of about 0.005 to 0.010 inches (0.127 to 0.254 mm), and more preferably about 0.008 inches (0.2 mm), from the substrate disk 13, the disk 13 will be retained against chuck 12 at a force which is sufficient to withstand the forces created during most conventional grinding and machining processes. Using the preferred embodiment described above, disk 13 can easily be maintained against face 14 of chuck 12 at a force of from about 2 to 5 atmospheres (202 to 506 kilopascals).

A variety of different types of grinding and machining operations can be performed on disk 13 once it is retained against chuck 12 by fluid bearing 10. As mentioned above, in a preferred embodiment for grinding a disk to achieve a desired inside and outside diameter, grinding wheels 16 and 18 are provided for grinding the inside and outside diameters, respectively, of disk 13 to precision dimensions. Such grinding wheels can be any conventional wheels known in the art, such as, for example, diamond or cubic boron nitride wheels which are metal bonded, resin bonded, or vitreous bonded. However, it should be noted that suitable grinding wheels are not limited to this list, and other alternatives could also be employed.

In a preferred embodiment, conduit 54 is provided within fluid transfer section 22, so that cooling fluid may be transferred therethrough and applied to the internal diameter grinding wheel 16. A similar cooling fluid conduit (not shown) may be provided so that cooling fluid can be applied to grinding wheel 18. Examples of suitable cooling fluids include water, and other coolant fluids, and air and other gases, such as nitrogen, argon and so forth.

Figure 3:
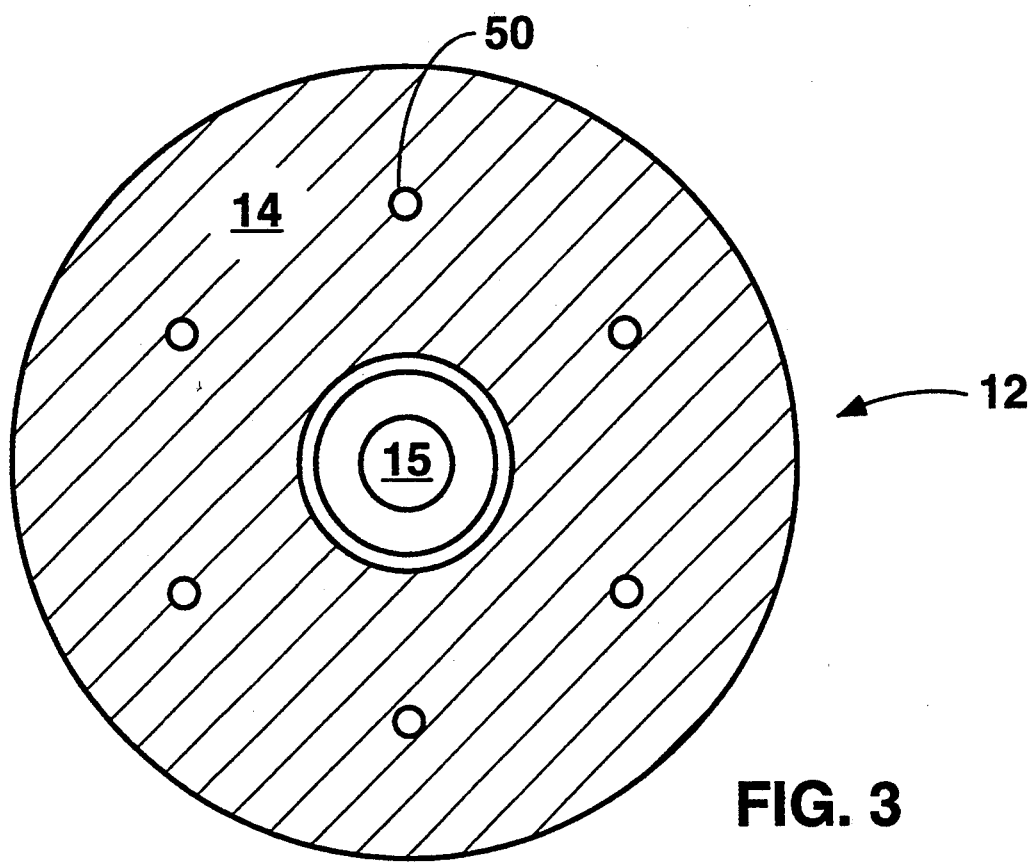
FIG. 3 is a front view of the face of the vacuum chuck taken along line 3—3 of FIG. 1.

FIG. 3 is a front view illustrating a suitable face for a vacuum chuck 12 in accordance with the present invention. In FIG. 2, face 14 of chuck 12 has a plurality of channels 50 through which a vacuum may be applied to disk 13. Prior to fluid being applied, through fluid bearing 10, the vacuum is typically applied at a rate of 25 inches Hg pressure (about 85 kilopascals).

Once the fluid is being applied by the fluid bearing 10, the vacuum applied by vacuum chuck 12 can be turned off, as the force generated by application of fluid by fluid bearing 10 is great enough to maintain the disk against the chuck by itself.

As mentioned above, fluid transfer member 22 is movably and rotatably connected to support section 24 via anchor ring 37. Consequently, fluid transfer member 22 is able to pivot to some extent, the amount of pivoting being dictated by the degree which anchor ring 37 is able to tilt within annular cavity 38. This ability to pivot allows fluid transfer member 22 to adjust itself and apply a more uniform amount of flow to each area of disk 13. For example, if fluid transfer member 22 were tilted slightly so that one edge of transfer member 22 was closer to the disk, the closer edge would apply a greater force to disk 13, and the extra force would push this edge away from disk 13 until a more uniform force around the entire contacting surface of disk 13 was achieved.

The invention has been described in detail with particular reference to preferred embodiments thereof, but it will be understood that variations and modifications can be affected within the spirit and scope of the invention.

What is claimed is:

1. An apparatus for retaining, during processing, a disk-like structure having opposed major surfaces, comprising:

a chuck having a surface for contacting at least a portion of one of the major surfaces of said structure; and a means for applying a flow of fluid to the other major surface of said structure, said flow of fluid sufficient to retain said structure against the contacting surface of said chuck during processing, said chuck contacting only the major surface of said disk-like structure, thereby exposing the entire peripheral edge of said structure for processing.

2. The apparatus of claim 1, wherein said means for applying a flow of fluid comprises a fluid bearing having a face, said face having at least one opening therein through which said fluid flows.

3. The apparatus of claim 2, wherein said face has a plurality of openings therein through which said fluid flows.

4. The apparatus of claim 3, said openings comprising a plurality of arcuate channels in the face of said fluid bearing, said channels in annular alignment on said face.

5. The apparatus of claim 4, further comprising a conduit connected to each channel for transporting fluid to each of the respective channels.

6. The apparatus of claim 1, wherein said surface of said chuck comprises a plurality of vacuum connected openings thereon for applying a vacuum to said one major surface.

7. The apparatus of claim 1, wherein said chuck is rotatable about an axis.

8. The apparatus of claim 7, further comprising at least one cutting tool movable in a direction perpendicular to said axis.

9. The apparatus of claim 1, wherein said fluid is water.

10. The apparatus of claim 2, wherein the face of said fluid bearing is located in a substantially parallel spaced relation to the contacting surface of said chuck.

11. The apparatus of claim 2, further comprising a support member, said fluid bearing rotatably connected to said support member.

12. The apparatus of claim 2, wherein the face of said fluid bearing has a smaller surface area than the disk-like structure to be processed.

13. The apparatus of claim 2, wherein said chuck and said fluid bearing are movable towards and away from one another.

14. An apparatus for retaining a disk-like structure having opposed major surfaces during processing comprising:

a disk support member, drivable about an axis, having a surface for contacting at least a portion of one of the major surfaces of said structure; and a fluid propelling means having a face, said face having at least one opening therein through which fluid is propelled on said structure, thereby retaining the structure against said disk support member.

15. The apparatus of claim 14, wherein said fluid propelling means is retained in rotatable relation to said support member so that said fluid propelling means adjusts itself, by propelling said fluid on said structure, and thereby enhances the uniformity of fluid flow on said structure.

16. A method of retaining a disk-like structure during machining operations comprising:

providing a chuck, driveable about an axis, having face thereon for contacting one side of said structure;

positioning said one side of said structure against said face; and applying a fluid to the other side of the structure and thereby retaining the said structure against the flat face of said chuck.

17. The method of claim 16 wherein the face of said chuck further comprises a plurality of vacuum connected openings thereon, and said method further comprises applying a vacuum to the other side of said structure.

18. The method of claim 17, wherein said vacuum is applied prior to said application of the fluid.

19. The method of claim 18, further comprising, prior to said application of said fluid, axially centering said structure on said chuck.

20. The method of claim 19, wherein said structure has an orifice therein, and said method further comprises providing a centering pin, and said centering comprises contacting the inside diameter of said orifice with said centering pin.

21. The method of claim 16, further comprising machining a portion of said structure.

22. The method of claim 20, wherein said machining comprises grinding the outside and inside diameter of said structure.

23. An apparatus for retaining, during processing, a disk-like structure having opposed major surfaces, comprising:

a chuck having a surface for contacting at least a portion of one of the major surfaces of said structure, said chuck surface comprising a plurality of vacuum connected openings thereon for applying a vacuum to one of the major surfaces of said disk-like structure; and a means for applying a flow of fluid to the other major surface of said structure, said flow of fluid sufficient to retain said structure against the contacting surface of said chuck during processing.

24. An apparatus for retaining, during processing, a disk-like structure having opposed major surfaces, comprising:

a chuck having a surface for contacting at least a portion of one of the major surfaces of said structure, said chuck rotatable about an axis; and a means for applying a flow of fluid to the other major surface of said structure, said flow of fluid sufficient to retain said structure against the contacting surface of said chuck during processing.

* * * * *